P. B. Cool,
Harness Saddle,
Nº 7,157.        Patented Mar. 12, 1850.
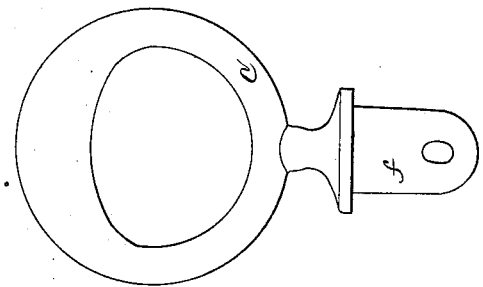
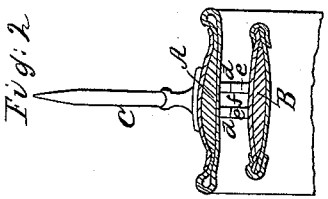
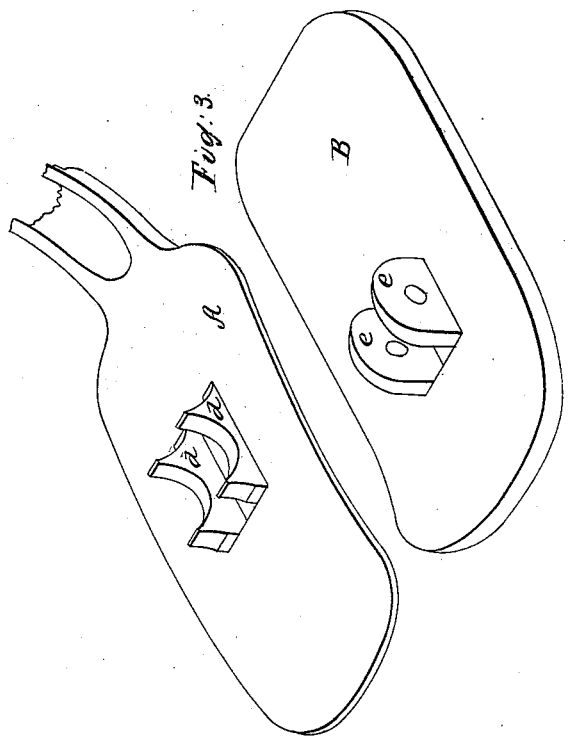
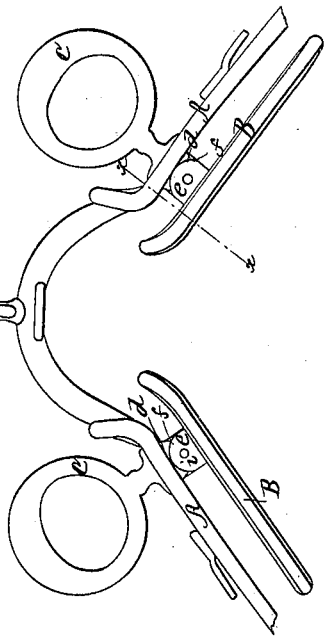

UNITED STATES PATENT OFFICE.

PETER B. COOL, OF COLUMBUS, OHIO.

FASTENING OF TERRETS IN HARNESS-SADDLES.

Specification forming part of Letters Patent No. 7,157, dated March 12, 1850.

*To all whom it may concern:*

Be it known that I, PETER B. COOL, of Columbus, in the county of Franklin and State of Ohio, have invented a new and improved manner of combining self-adjusting harness-pads with a saddle-tree and with the terrets; and I do hereby declare the following to be a full and exact description thereof, reference being had to the accompanying drawings, making a part of this specification.

The nature of my invention consists in uniting a self-adjusting pad, B, to one of the legs, A, of a saddle-tree, and also to the terret C, by means of a single joint, composed substantially in the manner hereinafter set forth.

Figure 1 in the accompanying drawings is a side view of a harness-saddle; Fig. 2, a section in the line $x$ $x$ of Fig. 1, and Fig. 3 an enlarged perspective view of one of the legs of a harness-saddle and of a metallic pad-plate.

Similar letters indicate like parts in all the figures.

Each leg A of the saddle-tree has an aperture formed in it, from the sides of which descend the ears $d$ $d$. Ears $e$ $e$ project from the upper side of the metallic pad-plates, having curved extremities that accurately fit into the concave extremities of the ears $d$ $d$, descending from the leg of the saddle-tree. The terret C has a flat shank, $f$, with a curved extremity that is inserted into the aperture in the leg A, and fits accurately between the ears $d$ $d$ and $e$ $e$, so that by the insertion of a joint-pin, $i$, through the holes in the ears $e$ $e$ and through the hole in the shank $f$ of the terret the terret C and the adjustable pad B will be strongly and securely combined with the leg A of a harness-saddle, and in such a manner that the pad will move freely and adjust itself to the shape of the horse.

By the usual complicated manner of combining adjustable pads to the legs of a harness-saddle, the pads frequently turn and change their positions upon the back of a horse, at the risk of doing him great injury, which occurrence, it will readily be perceived, cannot take place when the pads are combined with the saddle-legs and the terrets by my improved manner.

What I claim as my invention, and desire to secure by Letters Patent, is—

The combination of an adjustable pad, B, and a terret, C, with each other and with one of the legs, A, of a harness-saddle tree by means of a single joint, so constructed that neither the pad nor the terret can be turned on their axes from their proper positions, substantially as herein set forth—to wit, by means of a rectangular opening in each leg A of the saddle-tree, with lugs $d$ $d$ descending from its sides for the reception of the shank $f$ of a terret, C, and by the ears $e$ $e$, rising from the upper side of a pad, B, that receive between them the end of the shank $f$ of the terret, through holes in which ears and terret-shank the rivet $i$ passes and hold the three parts A B C securely together.

PETER B. COOL.

Witnesses:
Z. C. ROBBINS,
J. H. GODDARD.